US011188553B2

(12) United States Patent
Puvvada et al.

(10) Patent No.: US 11,188,553 B2
(45) Date of Patent: Nov. 30, 2021

(54) SYSTEM AND METHOD FOR IMPORTATION OF CONFIGURATION ITEM (CI) DATA INTO A CONFIGURATION MANAGEMENT DATABASE (CMDB)

(71) Applicant: ServiceNow, Inc., Santa Clara, CA (US)

(72) Inventors: Madhavi Puvvada, Kirkland, WA (US); Navindra Sharma, Seattle, WA (US); Ritika Goyal, Seattle, WA (US); Serina Chang, Seattle, WA (US); Tara Herputri Tarjoto, Seattle, WA (US); Michael Joseph Marson, Madison Heights, MI (US); Nathan William Goretski, Madison Heights, MI (US)

(73) Assignee: ServiceNow, Inc., Santa Clara, CA (US)

( * ) Notice: Subject to any disclaimer, the term of this patent is extended or adjusted under 35 U.S.C. 154(b) by 99 days.

(21) Appl. No.: 16/731,390

(22) Filed: Dec. 31, 2019

(65) Prior Publication Data
US 2021/0200780 A1    Jul. 1, 2021

(51) Int. Cl.
*G06F 17/30*     (2006.01)
*G06F 16/25*     (2019.01)
(Continued)

(52) U.S. Cl.
CPC ........ *G06F 16/252* (2019.01); *G06F 16/2282* (2019.01); *G06F 16/26* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 5,978,594 A | 11/1999 | Bonnell |
|---|---|---|
| 6,321,229 B1 | 11/2001 | Goldman |

(Continued)

OTHER PUBLICATIONS

U.S. Appl. No. 16/125,238, filed Sep. 7, 2018, Biran et al.
U.S. Appl. No. 16/402,085, filed May 2, 2019, Puvvada et al.

*Primary Examiner* — Hung D Le
(74) *Attorney, Agent, or Firm* — Fletcher Yoder PC

(57) ABSTRACT

An importation tool is disclosed that enables importation of configuration item (CI) data into a configuration management database (CMDB) from external services. The CMDB importation tool includes corresponding predefined configurations for particular external services that define how the data collected by the external services is imported into the CMDB, either directly or via one or more transformations, enabling importation of external service data regardless of the format or schema used by the external service. The CMDB importation tool enables relationships to be defined between attributes of the imported data, and ensures that these relationships are enforced during the importation process to provide improved internal consistency of the imported data. Additionally, certain CMDB classes may be modified with specialized fields to enable improved duplicate tracking and management within the CMDB. As such, these techniques enhance both the quantity and quality of CI data stored within the CMDB.

18 Claims, 10 Drawing Sheets

(51) Int. Cl.
*G06F 16/22* (2019.01)
*G06F 16/28* (2019.01)
*G06F 16/26* (2019.01)

(56) References Cited

U.S. PATENT DOCUMENTS

| | | |
|---|---|---|
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,783,744 B2 | 8/2010 | Garg |
| 7,877,783 B1 | 1/2011 | Cline |
| 7,890,802 B2 | 2/2011 | Gerber |
| 7,930,396 B2 | 4/2011 | Trinon |
| 7,933,927 B2 | 4/2011 | Dee et al. |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,534,903 B2 | 4/2017 | Cline |
| 9,613,070 B2 | 4/2017 | Kumar |
| 9,631,934 B2 | 4/2017 | Cline |
| 9,645,833 B2 | 5/2017 | Mueller |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 10,210,205 B1 * | 2/2019 | Chandrashekar .. G06Q 10/0639 |
| 2008/0126439 A1 * | 5/2008 | Kaminsky ............ H04L 41/0856 |
| 2013/0205192 A1 * | 8/2013 | Spada ................... G06F 40/151 |
| | | 715/227 |
| 2013/0232149 A1 * | 9/2013 | Smith ................... G06F 16/972 |
| | | 707/740 |
| 2016/0182299 A1 * | 6/2016 | Polinati ............... H04L 41/5058 |
| | | 709/220 |
| 2017/0123885 A1 * | 5/2017 | Margalit .............. G06F 11/321 |
| 2017/0126472 A1 * | 5/2017 | Margalit ................. H04L 43/08 |
| 2018/0121486 A1 * | 5/2018 | Puvvada .................. G06F 21/62 |
| 2018/0322163 A1 | 11/2018 | Puvvada et al. |
| 2019/0050469 A1 | 2/2019 | Puvvada et al. |
| 2019/0104020 A1 | 4/2019 | Tero et al. |
| 2019/0266268 A1 | 8/2019 | Polinati et al. |
| 2019/0273665 A1 | 9/2019 | Polinati et al. |
| 2019/0342169 A1 | 11/2019 | Tero et al. |
| 2020/0272702 A1 * | 8/2020 | Takeda ................... G16C 20/80 |
| 2021/0132967 A1 * | 5/2021 | Hopkins ............. G06F 9/44505 |

\* cited by examiner

| | CMDB IMPORT TOOL + | | | | | |
|---|---|---|---|---|---|---|
| | IMPORT SOURCES (4) LAST UPDATED 30m AGO ⟳ | | 250 | 256 → +NEW IMPORT SOURCE | | |
| | NAME | SHORT DESCRIPTION | RECURRENCE | LAST IMPORT | IMPORT STATUS | NEXT IMPORT | RUN ORDER |
| 252A → | CROWDSTRIKE | COMPUTER AND NETWORK ADAPTERS | (EMPTY) | (EMPTY) | (EMPTY) | (EMPTY) | 102 |
| 252B → | SCCM | LINUX SERVERS | DAILY | 2019-04-01 12:00:00 | COMPLETED | 2019-04-02 12:00:00 | 103 |
| 252C → | QUALYS | OS AND APPLICATION STATUSES | DAILY | 2019-04-01 4:30:00 | IN PROCESS | 2019-04-02 4:30:00 | 104 |
| 252D → | FLEXERA | SOFTWARE ASSETS | WEEKLY | 2019-04-01 12:00:00 | COMPLETED | 2019-04-08 12:00:00 | 105 |
| | ↑254A | ↑254B | ↑254C | ↑254D | ↑254E | ↑254F | ↑254G |

CMDB IMPORT TOOL

CROWDSTRIKE

CROWDSTRIKE DATA

THE FOLLOWING CROWDSTRIKE DATA HAS BEEN AUTO-MAPPED TO CMDB. SELECT THE TABS BELOW TO REVIEW OR EDIT IMPORT RULES BEOFRE SCHEDULING IMPORT.

[SAVE DRAFT] [PREVIEW CMDB DATA] [SCHEDULE IMPORT]

| 4 | 3 | 2 | 1 |
|---|---|---|---|
| ATTRIBUTES MAPPED — 268 | CLASSES MAPPED — 270 | RELATIONSHIPS MAPPED — 272 | RELATED ITEMS MAPPED — 274 |

ATRIBUTES AND CLASSES  RELATIONSHIPS AND RELATED ITEMS

| Hostname | OS_Version | Last_Seen | First_Seen | Agent_Version | Se |
|---|---|---|---|---|---|
| BEAS-12345 | WINDOWS 7 | OCT 12 2018 12:20:30 | JUN 1 2017 12:00:01 | 3.6.5605.0 | 21 |
| AHGL-37291 | LINUX | JAN 10 2019 01:14:20 | JUL 12 2018 07:30:41 | 2.1.5105.4 | 13 |
| FJAN-38292 | LINUX | JAN 12 2019 13:05:55 | MAY 6 2018 18:03:05 | 5.1.5341.6 | 38 |
| JDCV-06625 | WINDOWS 7 | DEC 9 2018 06:17:32 | NOV 22 2018 01:12:48 | 9.4.4268.2 | 93 |
| ERCA-38201 | WINDOWS 7 | FEB 15 2019 16:02:01 | JAN 02 2019 12:04:01 | 3.7.2811.2 | 48 |

262A

Hostname — 290  ✕

☑ IMPORT — 294

TABLE TYPE — 296

CMDB CLASS TABLE

CLASS — 298
COMPUTER

ATTRIBUTE — 300
NAME

ADVANCED MAPPING OPTIONS — 302

ATTRIBUTE VALUES ▷

☑ NO TRANSFORMS NEEDED — 304

[CANCEL] [SAVE]

SYSTEM AND METHOD FOR IMPORTATION OF CONFIGURATION ITEM (CI) DATA INTO A CONFIGURATION MANAGEMENT DATABASE (CMDB)

BACKGROUND

The present disclosure relates generally to a configuration management database (CMDB), and, more specifically, to importing configuration item (CI) data into a CMDB from an external service.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Certain cloud computing services can host a configuration management database (CMDB) that tracks information regarding configuration items (CIs) associated with a client. For example, these CIs may include hardware, software, and combinations thereof, disposed on, or operating within, a client network. In order to provide effective resource management, the CI data stored within the CMDB should accurately reflect the current state of the CIs associated with a client network. One way in which the CI data is populated within the CMDB is via a discovery process in which a discovery server operates on the client network to discover CI data, which is then transmitted back to the cloud computing service for storage in the CMDB.

It is presently recognized that certain services that also support the client network, such as asset management services or security services, may also collect meaningful data regarding CIs of a client network. However, the data collected by these services may be in a schema or format that is not conducive for direct importation into the CMDB. Additionally, different clients may want to import data collected by these services into their respective CMDBs in different manners for different purposes. Furthermore, the data collected by these services may include not adhere to the constraints of the CMDB, such as class relationships or relational database table relationships, and may include duplicate data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an importation tool that enables importation of configuration item (CI) data into a configuration management database (CMDB) from external services. The disclosed CMDB importation tool includes a graphical user interface (GUI) that enables a designer to define an importation source that retrieves CI data from an external service. The CMDB importation tool includes corresponding predefined configurations for particular external services that define how the data collected by the external services can be imported into the CMDB. For example, an import configuration can specify that certain columns or fields in the data received from the external service are directly imported into particular columns or fields of certain CMDB tables, while predefined transformations are applied to other fields prior to importation. These transformations enable the importation of CI data, regardless of the format or schema of the raw data received from the importation source. The GUI of the CMDB importation tool also enables configurations to be newly defined or customized to accommodate different CMDB designs. Additionally, the GUI of the CMDB importation tool enables relationships to be defined between fields of the imported data, such that the CMDB importation tool can ensure that these relationships are enforced during the importation process, enabling improved internal consistency of the imported data. Furthermore, in certain embodiments, certain CI tables of the CMDB may include a "Duplicate Of" field that is used by the CMDB importation tool to enable improved duplicate tracking and management within the CMDB. As such, the CMDB importation tool enhances the quality and accuracy of the CI data within the CMDB, improving the ability of the CMDB to effectively be used to manage CIs associated with the client network.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 5, 6, 7, 8, and 9 are simulated screenshots of portions of a graphical user interface (GUI) of the CMDB importation tool, in accordance with aspects of the present disclosure.

DETAILED DESCRIPTION

Figure 1:
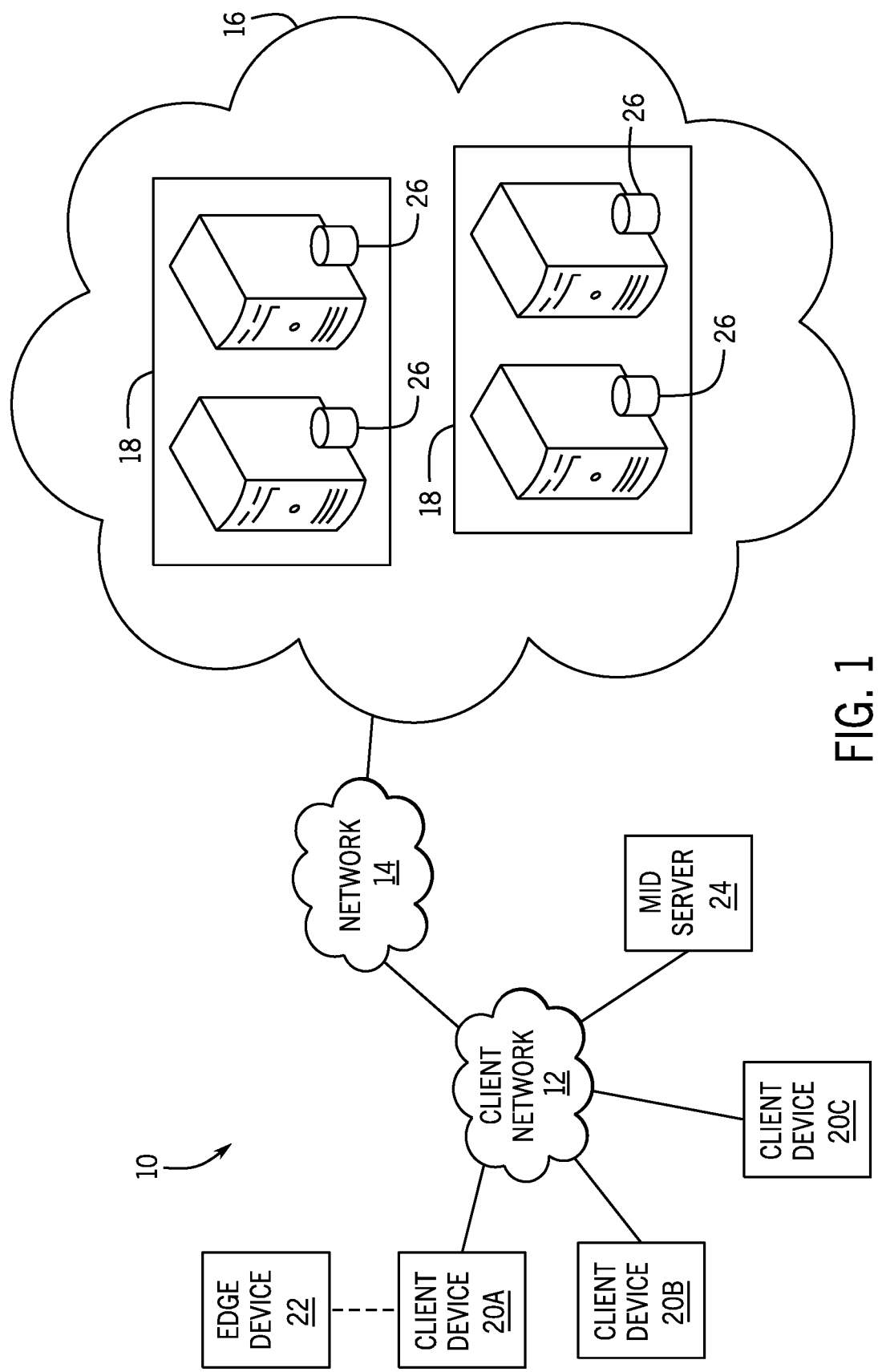
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB.

As used herein, an "external service" refers to one or more applications hosted by a processor that is separate from a data center hosting a client instance and that is communicatively coupled to the data center via a suitable network connection. Additionally, it may be appreciated that the discussion below is directed to a class-based database structures, while in other embodiments, a relational database structures may be used. With this in mind, for the class-based examples below, the terms "class" and "table" are used interchangeably, and the terms "attribute", "field", and "column" are used interchangeably.

Present embodiments are directed to an importation tool that enables importation of configuration item (CI) data into a configuration management database (CMDB) from external services. The disclosed CMDB importation tool includes a graphical user interface (GUI) that enables a designer to define an importation source that retrieves CI data from an external service. The CMDB importation tool includes corresponding predefined configurations for particular external services that define how the data collected by the external services is imported into the CMDB. For example, an import configuration can specify that certain attribute values in the data received from the external service are directly imported into particular attributes of certain CMDB classes, while predefined transformations are applied to other fields prior to importation. These transformations enable the importation of CI data regardless of the format or schema of the raw data received from the importation source. The GUI of the CMDB importation tool also enables configurations to be newly defined or customized to accommodate different CMDB designs. Additionally, the GUI of the CMDB importation tool enables relationships to be defined between attributes of the imported data, such that the CMDB importation tool can ensure that these relationships are enforced during the importation process, enabling improved internal consistency of the imported data. Furthermore, in certain embodiments, certain CMDB classes may include a "Duplicate Of" attribute that can be used by the CMDB importation tool to enable improved duplicate tracking and management within the CMDB.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
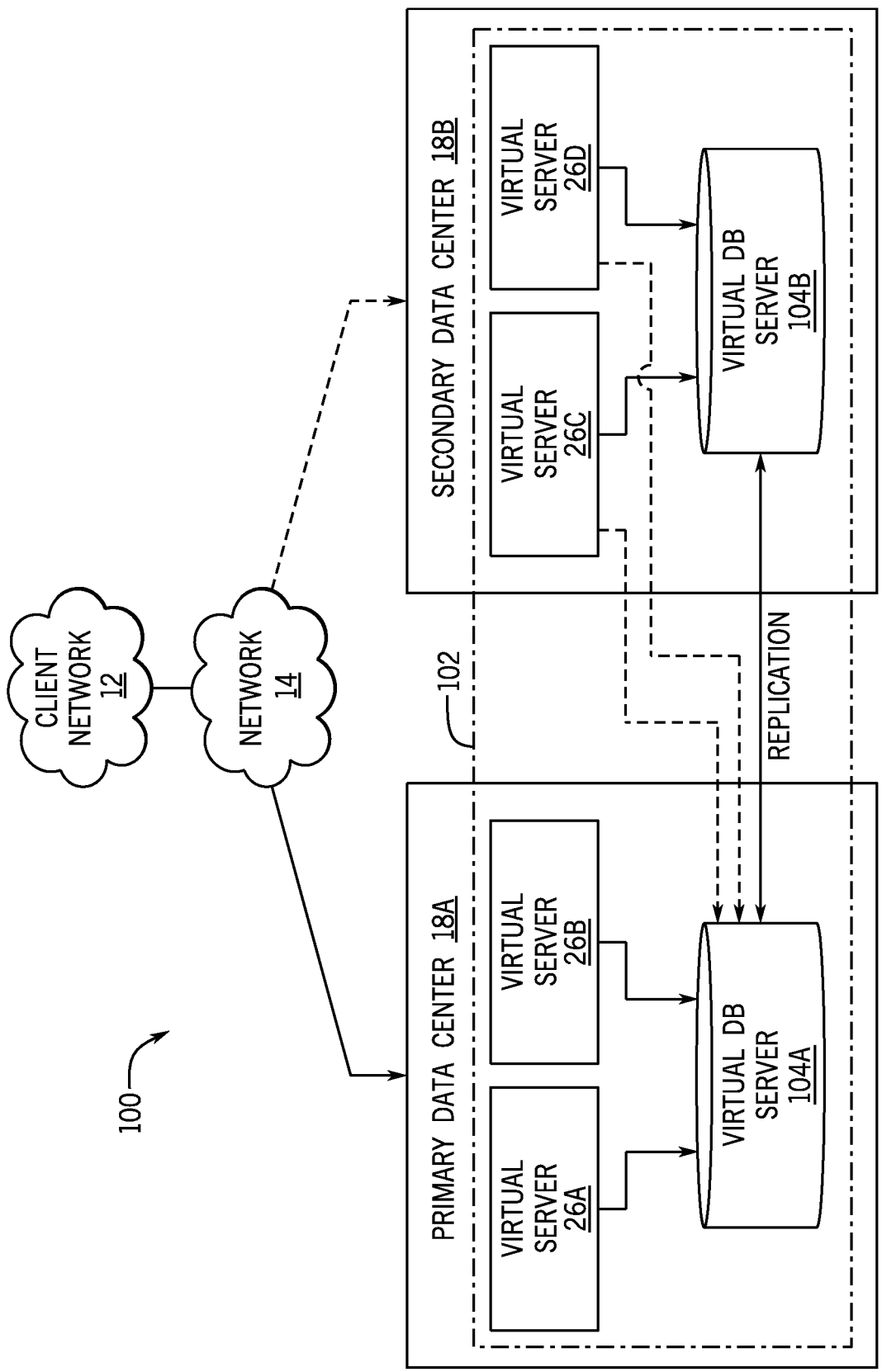
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
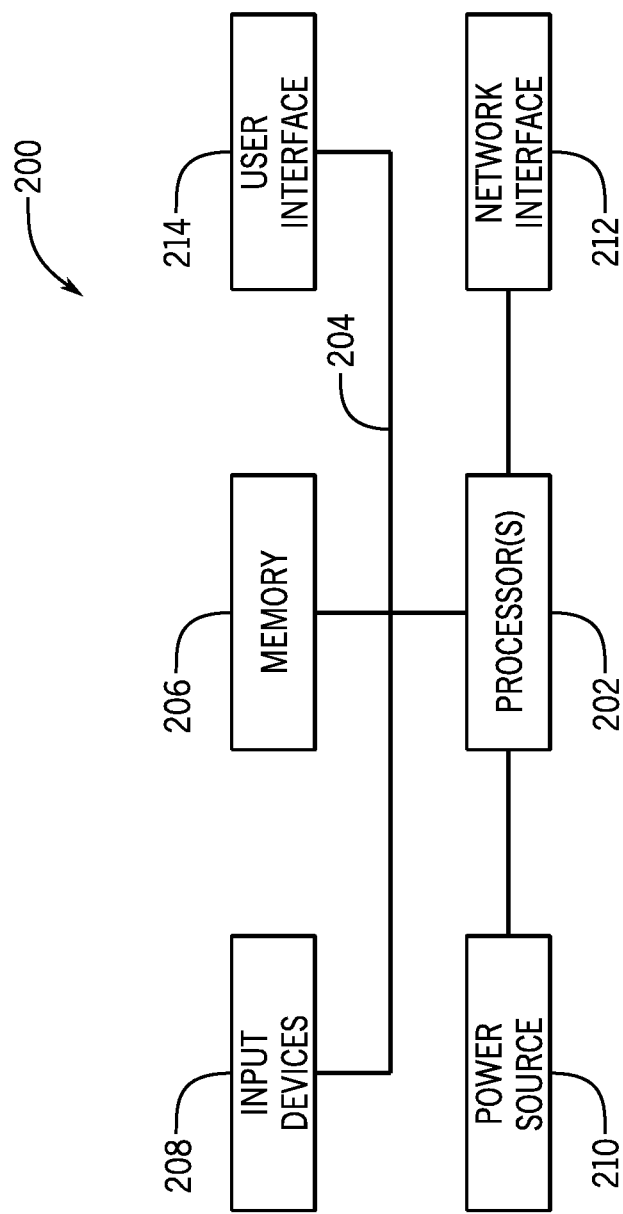
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
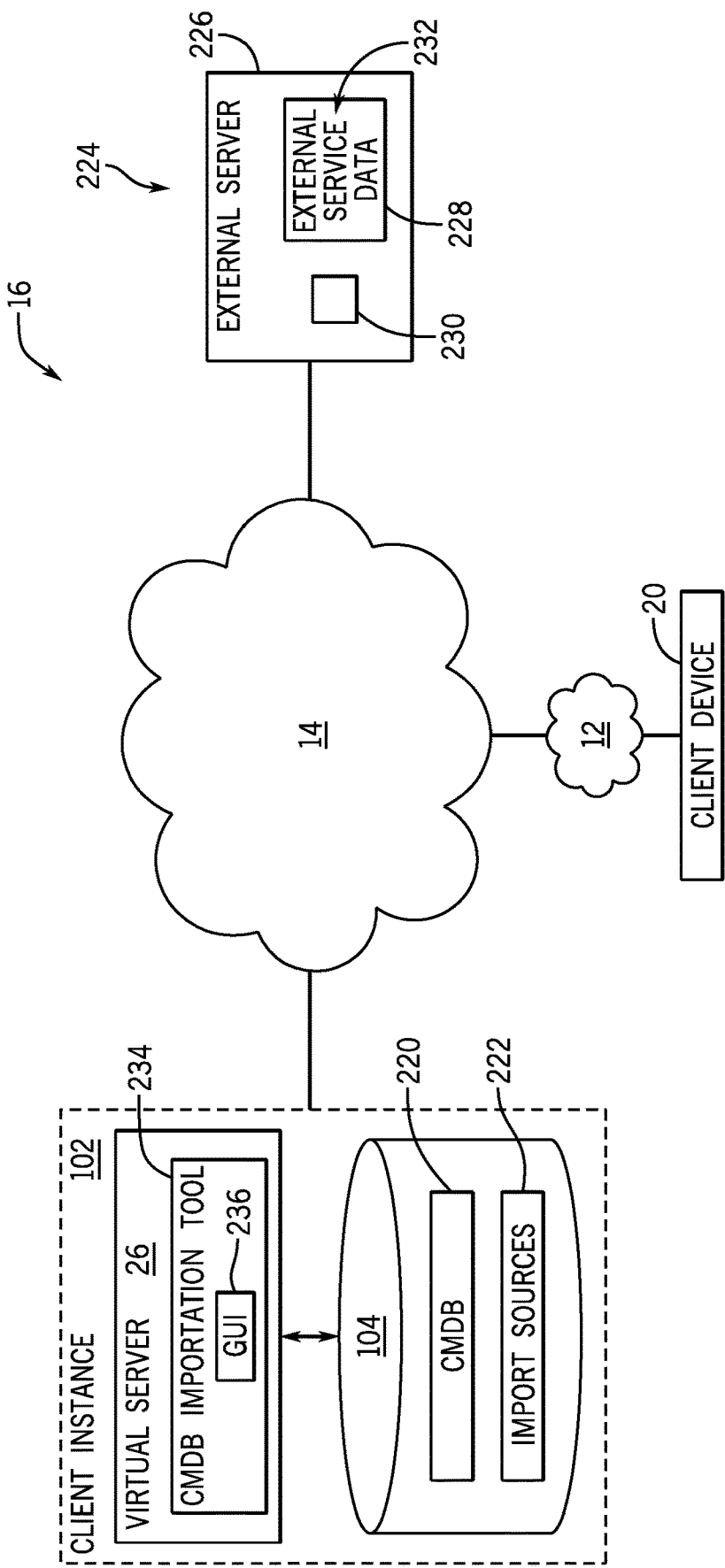
FIG. 4 is a block diagram illustrating an embodiment in which a virtual server supports and enables the client instance as part of a configuration management database (CMDB) and a CMDB importation tool, in accordance with aspects of the present disclosure.

With the preceding in mind, FIG. 4 is a block diagram illustrating an embodiment in which a virtual server 26 supports and enables the client instance 102 as part of a configuration management database (CMDB) 220, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

For the embodiment illustrated in FIG. 4, the client instance 102 includes and is supported by the database server 104. The database server 104 hosts a number of database tables storing information relating to the operation of the CMDB 220. The CMDB 220 includes any suitable number of related CI classes (e.g., a computer class, a network adapter class, a LINUX server class, and so forth), wherein these classes are designed to store any suitable number of attributes (e.g., name, serial number, operational status) for each CI entry. For the illustrated embodiment, the database server 104 also hosts an import sources table 222 that stores configuration and status information for import operations, as discussed below. For example, the import sources table 222 may store attributes for each import source, such as a name of the import source, a short description of the import source, a recurrence of an import operation to retrieve data from the import source, a timestamp of the last recurrence of the import operation, a status of the last recurrence of the import operation, a timestamp of the next recurrence of the import operation, a relative run order of the import operations, and so forth. In certain embodiments, the import sources table 222 may be part of the CMDB 220.

As mentioned above, in certain cases, an external service 224 may support the operation of the client network 12. The illustrated external service 224 is hosted by an external server 226 that is communicatively coupled to the client network 12 and the client instance 102 via the network 14. The external server 226 includes at least one memory 228 storing instructions and at least one processor 230 configured to execute these instructions to provide the desired functionality to the client network 12. In certain embodiments, at least a portion of the external service 224 may be hosted by a server disposed on the client network 12.

The external service 224 provides functionality to the client network 12. A non-limiting list of example external services includes: a security service, a financial service, a resource/asset tracking service, resource/asset management service, server/client management service, and so forth. As such, to provide the desired functionality, the external service 224 may collect and maintain external service data 232 (also referred to herein as "import source data") regarding various CIs (e.g., hardware, software, internal services) associated with the client network 12 within the at least one memory 228. This external service data 232 may include, for example, resource usage data, configuration data, operational status data, purchase and acquisition data, and so forth. When the external service data 232 is configured for importation into the CMDB 220, as discussed below, the external service 232 may also be referred to herein as an import source.

As such, it is presently recognized that the data 232 of the external service 224 may be useful source of meaningful CI data to have within the CMDB 220. However, the data collected by the external service 224 may be in a schema or format that is not conducive for direct importation into the CMDB 220. Additionally, it is recognized that different clients may want to import data collected by the external service 224 into their respective CMDBs in different manners for different purposes. Furthermore, the data collected by these services may include not adhere to the constraints of the CMDB 220, such as class relationships or relational database table relationships, and may include duplicate data.

With the foregoing in mind, for the embodiment illustrated in FIG. 4, the virtual server 26 of the client instance 102 hosts a CMDB importation tool 234. The CMDB importation tool 234 is an application that is stored in a suitable memory of the virtual server 26 and executed by a suitable processor of the virtual server 26 to facilitate the importation of external service data 232 into the CMDB 220. The disclosed CMDB importation tool 234 includes a graphical user interface (GUI) 236 that enables a user (e.g., a developer or designer) to define import sources and operations in the import sources table 222 with respect to the external service 224. As discussed below, the GUI 236 enables the user to specify the particular portions of the external service data 232 to be imported, the corresponding attributes and classes of the CMDB 220 that will receive the data, various data transformations (e.g., cleansing) to occur before the data is saved to the CMDB 220, as well relationships that should be enforced in the external service data 232 to ensure data integrity. In certain embodiments, the CMDB importation tool 234 includes (e.g., stored in the import sources table 222) a predefined importation template that is configured for the particular external service 224 to provide an initial set of suggested mappings between the external service data 232 and the CMDB 220, and may also include particular suggested data transformations for particular portions of the external service data 232 and enforce particular relationships within the external service data 232. As such, the disclosed CMDB importation tool 234 enables importation of external service data 232 that exists a variety of schemas and data formats. Once an import operation has been defined using the GUI 236, the CMDB importation tool 234 performs the import operation to import the external service data 232 into the CMDB 220, in accordance with the configuration of the import operation.

FIG. 5 is a simulated screenshot of a portion of the GUI 236 of the CMDB importation tool 234. More specifically, the portion of the GUI 236 illustrated in FIG. 5 includes a table 250 presenting a number of import operations 252, which is a portion of the data stored in the import sources table 222. For the illustrated example, each of the import operations 252 is associated with a different type of import source. The table 250 includes a "Name" column 254A that stores the name of the import source associated with each of the import operations 252, a "Short Description" column 254B that stores a textual description of each of the import operations 252, and a "Recurrence" column 254C that stores a value indicating how often each of the import operations 252 should be performed. The table 250 also includes a "Last Import" column 254D that stores a timestamp indicating when each of the import operations 252 was last performed, an "Import Status" column 254E storing a value indicating a state (e.g., new, completed, in-process, error) of each of the import operations, a "Next Import" column 254F that stores a time-date stamp indicating when each of the import operations 252 should be performed again, and a "Run Order" column 254G that stores a numerical value indicating the order in which the import operations 252 are performed. It may be appreciated that the illustrated GUI 236 enables a user to interact with (e.g., select, click on, touch) certain fields, such as fields within the "Short Description" column 254B, the "Recurrence" column 254C, and the "Run Order" column 254G, to enable the user to alter these values to configure each of the import operations 252 within the import sources table 222.

It may be noted that, in other embodiments, additional fields may include authentication credentials (e.g., a username and password, a cryptographic certificate), an internet protocol (IP) address or uniform resource locator (URL) of the external server 226, a timeout window, and so forth. It may be appreciated that, for certain external services 224, during an import operation, the CMDB importation tool 234 may send a message to the external service 224 via the network 14 to request that the external service 224 provide the external service data 232, while in other embodiments, the external service 224 may be configured to automatically provide the external service data 232 to the CMDB importation tool 234 at predetermined intervals (e.g., once per day, once per week, once per month). In still other embodiments, the user may manually download the external service data 232 from the external service 224 to a client device 20, and the user may upload the external service data 232 to the CMDB importation tool 234 via a suitable user interface element of the GUI 236 for importation into the CMDB 220.

For the portion of the GUI 236 illustrated in FIG. 5, the import operations 252 include: an import operation 252A for a CROWDSTRIKE® import source, an import operation 252B for a SCCM® import source, an import operation 252C for a QUALMS® import source, and an import operation 252D for a FLEXERA® import source. As such, the import sources indicated by the table 250 represent different applications or services that determine information regarding CIs associated with the client network 12 while providing some functionality (e.g., security, resource/asset tracking, resource/asset management, server/client management) to the client network 12. For example, certain external services 224 may correspond to an endpoint detection and response service that collects information regarding potential intrusion events in the client network 12, to a system manager application that that is used to configure or control operation of devices on the client network 12, to a cloud-base security and compliance service that scans devices on the client network 12 for vulnerabilities and risk assessment, to an informational technology asset management service that analyzes the client network 12 to determine hardware and software resources disposed therein, or to any other suitable application or service that collects CI information (e.g., hardware information, software information, status information, incident information) for resources of the client network 12. Additionally, in certain embodiments, the CMDB importation tool 234 may include default import configurations defined for a set of external services 224 that are commonly used by clients that suggest how the external service data 232 might be imported into the CMDB 220. However, as discussed herein, the user may customize the import configuration of each of the import operations 252 to suit the particular needs of the client and the particular structure of the clients CMDB 220.

For the illustrated embodiment, the import operation 252A was created in response to the user selecting the new import source button 256 and has not been completely configured. In addition to the user being able to interact with the fields of the table 250 to set the recurrence, the run order, and so forth, the user may interact with the presented value in the "Name" column 254A to configure how the CI data collected by the import operation 252A will be imported into the CMDB 220. For example, FIG. 6 is a simulated screenshot of another portion of the GUI 236 of the CMDB importation tool 234 that is designed to present additional information about the import operation 252A in response to the user selection of the import operation 252A from the portion of the GUI illustrated in FIG. 5.

Figure 6:
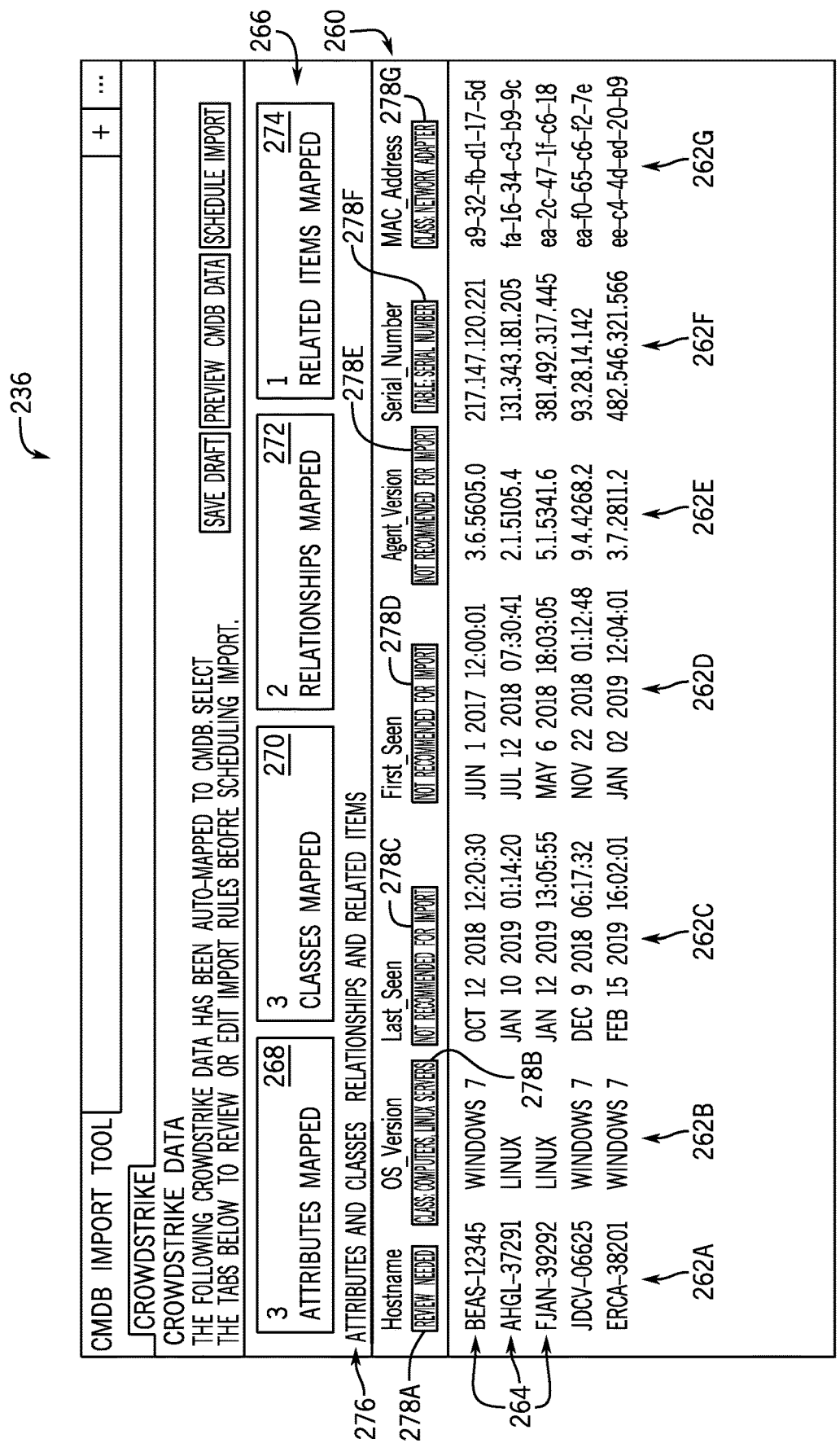

The portion of the GUI 236 illustrated in FIG. 6 corresponds to a CROWDSTRIKE® import source that is in the process of being configured for importation of CIs data into the CMDB 220. The portion of the GUI 236 illustrated in FIG. 6 includes a table 260 presenting sample external service data 232 collected by the corresponding external service 224. The table 260 includes a number of columns or attributes including: a "Hostname" attribute 262A, an "OS Version" attribute 262B, a "Last Seen" attribute 262C, a "First Seen" attribute 262D, an "Agent Version" attribute 262E, a "Serial Number" attribute 262F, and a "MAC address" attribute 262G. The table 260 includes a number of entries or records 264, each representing information for a particular CI of the client network 12, which corresponds to computers and network adapters for the illustrated example. It may be appreciated that, in certain embodiments, the sample data presented in the table 260 may not be retrieved from the external service 224, but may be representative of the schema and format of the data expected to be received from the external service 224 during import.

The portion of the GUI 236 illustrated in FIG. 6 also includes a summary section 266 that summarizes how the data collected by the import source will be imported into the CMDB 220 when the importation process is performed. For example, the illustrated summary section 266 includes an "Attributes Mapped" field 268 that presents an integer value indicating the number of attributes or fields of the import source data that have been mapped to particular attributes or fields of CIs of the CMDB 220. The illustrated summary section 266 includes a "Classes Mapped" field 270 that presents an integer value indicating the number of classes or tables of the import source data have been mapped to particular CI classes or tables of the CMDB 220. The illustrated summary section 266 also includes a "Relationships Mapped" field 272 that presents an integer value indicating the number of relationships (e.g., class relationships, primary/foreign key relationships) that will be enforced when the import source data is imported into the CMDB 220. The illustrated summary section 266 further includes a "Related Items Mapped" field 274 that presents an integer value indicating a number of attributes or fields of the import source data that are mapped to be imported into multiple attributes or fields of the CMDB 220.

Additionally, for the embodiment of the GUI 236 illustrated in FIG. 6, the "Attributes and Classes" tab 276 is selected, which presents the aforementioned table 260. Each of the columns or attributes 262 listed in the table 260 includes a respective attribute configuration status element (e.g., selectable text boxes, buttons) having text indicating information about the configuration status of the particular attribute for the import operation. For example, as illustrated, the text of the attribute configuration status element 278A indicates that the user should review the configuration of the import operation for attribute 262A. The text of attribute configuration status elements 278B and 278F indicates that the corresponding attributes 262B and 262F have been suitably mapped to classes or tables of the CMDB 220. The text of attribute configuration status elements 278C, 278D, and 278E indicates that the corresponding attributes 262C, 262D, and 262E have not been configured for import and/or are not recommended for import into the CMDB 220. In certain embodiments, these attribute configuration status elements 278 are colored or shaded to provide visual cues to the user. For example, the corresponding attribute configuration status elements 278B and 278F for attributes that have been configured for import may have a first color (e.g., green), the corresponding elements 278C, 278D, and 278E for attributes that have not been configured for import may have a second color (e.g., grey), and the corresponding element 278A for the attribute 262A that is only partially configured may have a third color (e.g., yellow). As such, for this example, the default import configuration for this external service 224 included a number of suggested mappings, transformations, and relationships within the external service data 232, and the GUI 236 enables the user to further refine the import configuration to address situations in which portions of the default import configuration do not match the particular structure of the client CMDB 220 or further customization is desired.

For the embodiment of the GUI 236 illustrated in FIG. 6, the attribute configuration status elements 278 are selectable to enable the user to configure the corresponding attributes for the import operation. For example, the user may select (e.g., using a mouse click) attribute configuration status element 278A, and in response, the GUI 236 may present additional user input mechanisms to enable the user to configure the attribute 262A for importation, as illustrated in FIG. 7. More specifically, in response to the GUI 236 receiving the user selection of attribute configuration status element 278A, which is requesting further user review, the appearance of the table 260 is modified such that attribute 262A is highlighted or otherwise emphasized to indicate which of the attributes is being configured, as shown for attribute 262A in FIG. 7. It may be appreciated that this further review may occur when the default import configuration, which may be designed based on common CMDB structures, does not match the particular structure (e.g., class and attribute names and relationships) of the client CMDB 220.

Additionally, the portion of the GUI 236 illustrated in FIG. 7 includes an attribute import configuration pane 290 having a suitable set of user interface elements (e.g., user input mechanisms) to enable the user to configure the selected attribute 262A for import. For the example illustrated in FIG. 7, the attribute import configuration pane 290 corresponds to the selected "Hostname" attribute 262A of the table 260, as indicated by the title field 292. The illustrated attribute import configuration pane 290 includes an import checkbox 294 that, when selected, increases the number of mapped attributes to four, as indicated by the "Attributes Mapped" field 268. The illustrated attribute import configuration pane 290 also includes a "Table Type" field 296 that includes a drop-down list storing selectable options, such as "CMDB Class Table" or "non-CMDB Class Table", indicating the type of the table hosted by the database server 104 into which the attribute data will be imported. The illustrated attribute import configuration pane 290 also includes a "Class" field 298 having a drop-down list storing selectable options of particular classes or tables into which the attribute data will be imported. It may be appreciated that the options available for selection in the "Class" field 298 may be populated with CMDB tables or classes when the "CMDB Class Table" option is selected in the "Table Type" field 296, and populated with non-CMDB tables or classes when the "non-CMDB Class Table" option is selected in the "Table Type" field 296. The illustrated attribute import configuration pane 290 also includes an "Attribute" field 300 that having a drop-down list storing selectable options of particular attributes or fields into which the attribute data will be imported. It may be appreciated that the options available for selection in the "Attribute" field 300 are populated with attributes or fields of the class or table selected in the "Class" field 298 to facilitate user selection.

Figure 8:
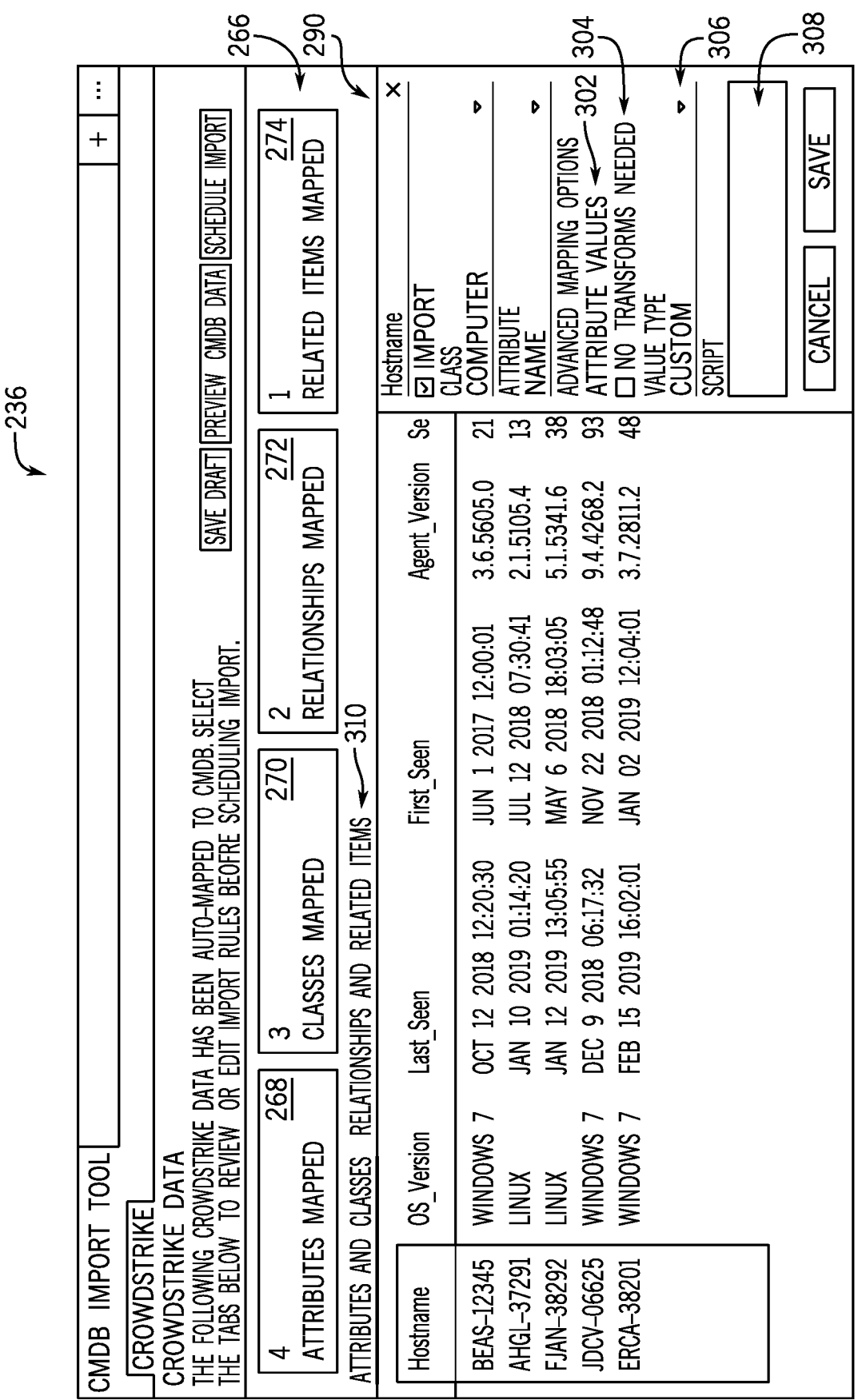

Additionally, the attribute import configuration pane 290 illustrated in FIG. 7 includes an "Attributes Values" section 302 having a "No Transforms Needed" checkbox 304 that is selected. When the "No Transforms Needed" checkbox 304 is selected, then the data of the selected attribute 262A will be directly imported into the class and attribute indicated by the user selections in the "Class" field 298 and the "Attribute" field 300. However, when the "No Transforms Needed" checkbox 304 is unselected, then the user may be presented with additional user input mechanisms to define how the data should be transformed prior to before being imported, as illustrated in FIG. 8. For the portion of the GUI 236 illustrated in FIG. 8, in response to the user unselecting the "No Transforms Needed" checkbox 304, the attribute import configuration pane 290 has been updated to include a "Value Type" field 306 and a "Script" field 308. The "Value Type" field 306 includes a drop-down list storing selectable options of predefined transformations, such as "Remove all punctuation," "Remove all special characters," "Convert integer/real number to string," "Make all letters capital," and so forth. In certain embodiments, the "Script" field 308 is presented in response to the user selecting a "Custom" option in the "Value Type" field 306. Accordingly, by providing suitable text in the "Script" field 308, the user can define a customized script that transforms the data of the selected attribute 262A before the data is imported into the CMDB 220.

As mentioned, the summary section 266 of the portion of the GUI 236 illustrated in FIGS. 6-8 includes the "Relationships Mapped" field 272 that presents the integer value indicating the number of relationships (e.g., primary/foreign key relationships) that will be enforced when the import source data is imported into the CMDB 220, and a "Related Items Mapped" field 274 that presents an integer value indicating a number of attributes or fields of the import source data that are mapped to be imported into multiple attributes or fields of the CMDB 220. In certain embodiments, in response to receiving a user selection (e.g., a mouse click) of the "Relationships and Related Items" tab 310, the CMDB importation tool 234 may present the portion of the GUI 236 illustrated in FIG. 9. In addition to the summary section 266 discussed above, the portion of the GUI 236 illustrated in FIG. 9 includes a "Relationships" section 320 and a "Related Items" section 322. For the illustrated example, the two mapped relationships are defined by row 324 and row 326 of the "Relationships" section 320, and the one related item is defined by row 328 of the "Related Items" section 322. It may be appreciated that the data presented by the GUI 236 may be stored within the import sources table 222, or another suitable location.

Figure 9:
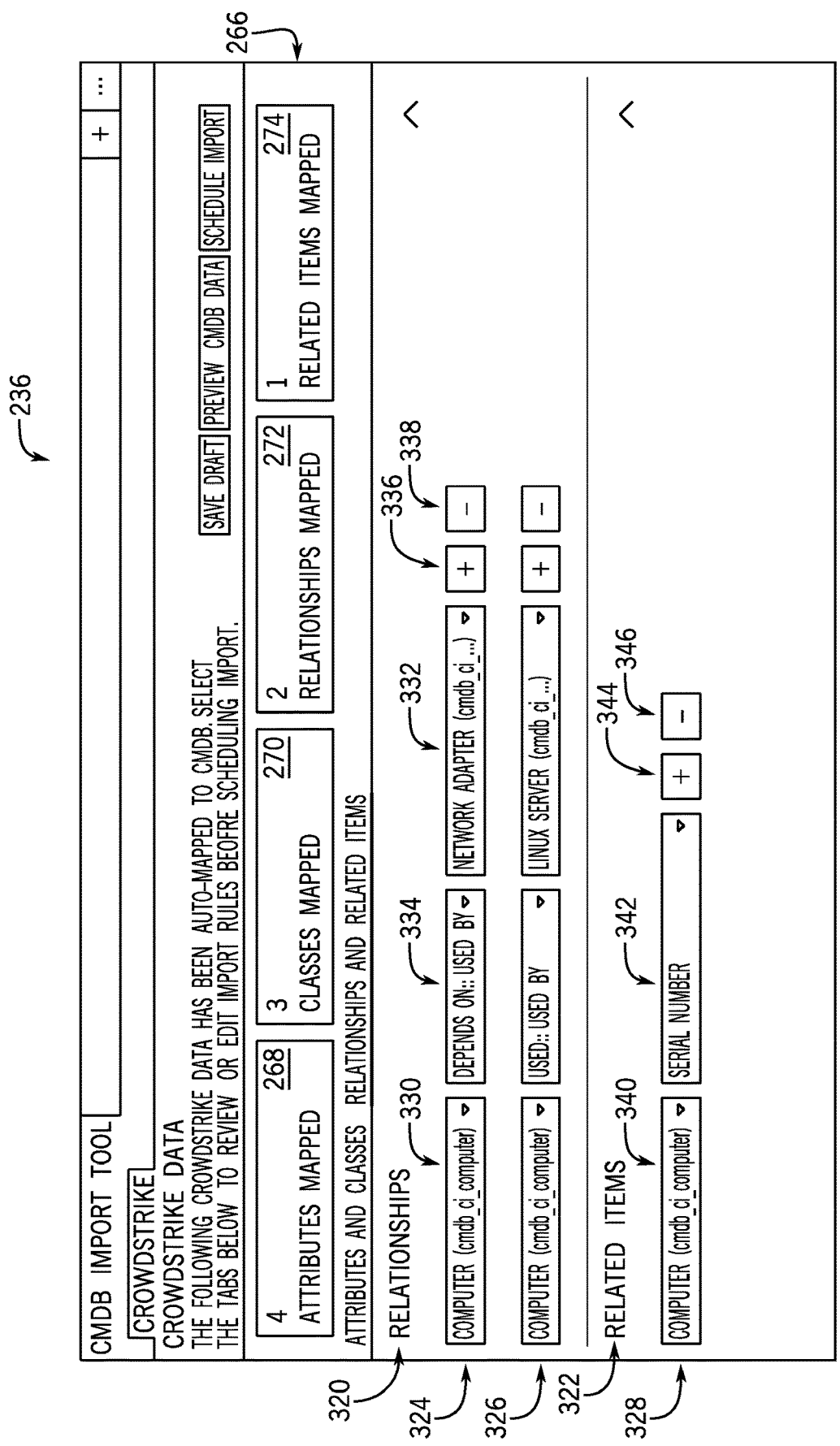

For the portion of the GUI 236 illustrated in FIG. 9, rows 324 and 326 of the "Relationships" section 320 each include a respective set of user interface elements (e.g., user input mechanisms) that are designed to receive user selections to define a relationship to be enforced during the importation process. For the example embodiment, these user interface elements include a "Parent Class" field 330 having a drop-down list storing selectable options of particular classes or tables that are the parent in the parent-child class relationship being specified, as well as a "Child Class" field 332 having a drop-down list storing selectable options of particular classes or tables that are the child in the parent-child class relationship being specified. Additionally, these user interface elements include a "Relationship Type" field 334 having a drop-down list storing selectable options (e.g., "Depends on::Used by", "Used::Used by") that define the nature of each parent-child class relationships. In certain embodiments, the "Relationship Type" field 334 may be populated with relationships that are defined between the classes selected by the "Parent Class" field 330 and the "Child Class" field 332 within the CMDB 220. Additionally, each of the rows 324 and 326 includes selectable user interface elements, such as the "+" button 336 and the "−" button 338, to enable the addition of additional relationships or the removal of a defined relationship, respectively. As such, for the illustrated example, the importation process will only import external service data 232 that complies with the relationships defined in the "Relationships" section 320 of the GUI 236. For example, the importation process will not import data into the Network Adapter CI class, unless there is a related entry present in the Computer CI class or that will also be imported as part of the importation process.

For the portion of the GUI 236 illustrated in FIG. 9, row 328 of the "Related Items" section 322 includes a respective set of user interface elements that are designed to receive user selections to define related items. These user interface elements include a "Class" field 340 having a drop-down list storing selectable options of particular classes or tables, and a "Related Item" field 342 indicating an attribute or field of the import source data. As such, while the "Serial Number" attribute 262F is mapped to be imported into a serial number CMDB table, as indicated by element 278F in FIG. 6, this data is also mapped to be imported into a computer CMDB table as a result of the selections in the "Related Items" section 322. Additionally, the row 328 includes selectable user interface elements, such as the "+" button 344 and the "−" button 346, to enable the addition of additional related items or the removal of a defined related item, respectively.

As mentioned, one challenge of importing external data into the CMDB 220 is dealing with duplicate data. For example, external service data 232 imported into the CMDB 220 may be redundant relative to data already present within the CMDB 220 (e.g., as a result of a discovery process), and the external service data 232 may itself contain duplicate entries. Duplicate CI records exist can lead to confusion and conflicting information regarding the state or configuration of a CI, which can lead to poor actionable intelligence. With this in mind, present embodiments are also directed to a system and method for dealing with duplicate CI entries within the CMDB 220.

Figure 10:
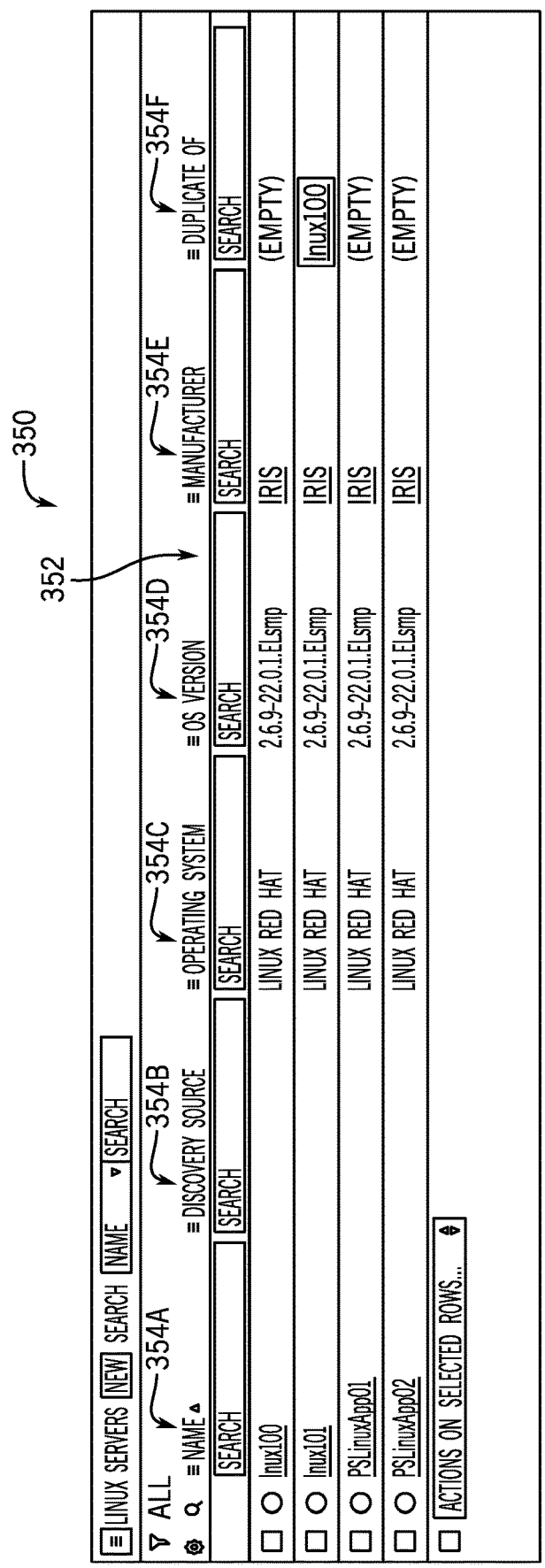
FIG. 10 is a simulated screenshot of a GUI presenting data from a class of the CMDB having a "Duplicate Of" attribute, in accordance with aspects of the present disclosure.

FIG. 10 is a simulated screenshot of a GUI 350 presenting CI data stored within a LINUX server CI class or table hosted by the database server 104 as part of the CMDB 220, as discussed above. For the illustrated example, the GUI 350 includes a table 352 that presents the corresponding CI data for LINUX servers of the LINUX service CI class, wherein the CI data may have been collected via discovery, manual entry, importation, or a combination thereof. As such, the table 352 includes columns 354 that correspond to the attributes stored within the LINUX server class, including a "Name" attribute 354A, a "Discovery Source" attribute 354B, an "Operating System" attribute 354C, an "OS version" attribute 354D, a "Manufacturer" attribute 354E, and a "Duplicate Of" attribute 354F. It may be appreciated that, while the LINUX servers CI table is illustrated and discussed as an example, the disclosed "Duplicate Of" attribute 354F may be included in some or all of the CI classes or tables of the CMDB 220.

The disclosed "Duplicate Of" attribute 354F of a CI table can be used to manage duplicate CI entries within the CMDB 220 in an efficient and effective manner. The "Duplicate Of" attribute 354F has a null value for a record that is not a duplicate of another entry in the table. When the record is a duplicate entry, the "Duplicate Of" attribute 354F is designed to store a reference (e.g., a unique identifier, a pointer) to the primary or master record of which the entry is a duplicate. For the example illustrated in FIG. 10, the second entry in the table 352 includes a defined "Duplicate Of" attribute 354F storing a reference to the first entry in the table 352, indicating that the second entry is a duplicate of the first entry in the CI table. It may be appreciated that any suitable number of duplicate entries can include a reference to the same master record. Additionally, in certain embodiments, the CMDB 220 may enforce a rule (e.g., a business rule, a database rule) that the reference stored in the "Duplicate Of" attribute 354F can only refer to a master record that is not a duplicate itself (e.g., an entry that lacks a defined "Duplicate Of" attribute 354F).

In certain embodiments, the value of the "Duplicate Of" attribute 354F may be manually defined by a user or automatically defined during an importation process. For example, in certain embodiments, the CMDB importation tool 234 may be configured to compare the values of certain attributes of an entry of the CMDB 220 to the values of certain attributes of an entry of the external service data 232, and may determine that the entry of the import source data is a duplicate of the existing entry in the CMDB 220 when the attribute values match. Accordingly, the CMDB importation tool 234 may import the entry of the import source data with a defined "Duplicate Of" attribute 354F that references the existing entry in the CMDB 220. In certain embodiments, when CI data is subsequently imported, discovered, or entered into the CMDB 220 for a record having a defined "Duplicate Of" attribute 354F, then the CMDB 220 instead follows the reference indicated by this field to identify the master record, and instead updates the master record with the CI data. In this manner, the CMDB 220 ensures that the master record for the CI includes current data for improved actionable information content within the CMDB, while also tracking the relationships between duplicate entries to enable a later reconciliation process to remove the duplicate entries from the CMDB 220 altogether.

The technical effects of the present disclosure include an importation tool that enables importation of configuration item (CI) data into a configuration management database (CMDB) from external services. The disclosed CMDB importation tool includes a graphical user interface (GUI) that enables a designer to define an importation source that retrieves CI data from an external service. The CMDB importation tool includes corresponding predefined configurations for particular external services that define how the data collected by the external services is imported into the CMDB, either directly or via one or more transformations. These transformations enable the importation of CI data regardless of the format or schema of the raw data received from the importation source. The GUI of the CMDB importation tool also enables configurations to be newly defined or customized to accommodate different CMDB designs. Additionally, the GUI of the CMDB importation tool enables relationships to be defined between attributes of the imported data, such that the CMDB importation tool can ensure that these relationships are enforced during the importation process, enabling improved internal consistency of the imported data. Furthermore, in certain embodiments, certain CMDB classes may include a "Duplicate Of" attribute that can be used by the CMDB importation tool to enable improved duplicate tracking and management within the CMDB. As such, the disclosed techniques enhance both the quantity and quality of CI data stored within the CMDB.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud-based configuration item database (CMDB) system, comprising:

at least one memory configured to store one or more configuration item (CI) tables of the CMDB system, an import sources table, and instructions of a CMDB importation tool;

at least one processor configured to execute the instructions of the CMDB importation tool to perform actions comprising:

presenting a graphical user interface (GUI) of the CMDB importation tool, wherein the GUI includes user input mechanisms configured to receive user input to define an import configuration of an import operation to import external service data into the CMDB;

receiving the user input via the GUI of the CMDB importation tool and defining the import configuration of the import operation based on the user input;

storing the import configuration of the import operation in the import sources table;

receiving the external service data from an external service; and importing the external service data into the one or more CI tables of the CMDB in accordance with the import configuration, wherein the import configuration comprises a mapping between attributes of the external service data and attributes of the one or more CI tables that defines where the external service data is stored in the CMDB during importing.

2. The system of claim 1, wherein the GUI comprises:

a first element that presents a first number of attributes of the one or more CI tables that are mapped to attributes of the external service data;

a second element that presents a second number of the one or more CI tables that are mapped to the external service data;

a third element that presents a third number of relationships between the one or more CI tables that are enforced when importing the external service data; and a fourth element that presents a fourth number of the attributes of the external service data that are mapped to multiple of the attributes of the one or more CI tables.

3. The system of claim 1, wherein the GUI comprises a table configured to present an example of the external service data, wherein each column of the table represents an attribute of the external service data, and wherein each attribute is associated with an attribute configuration status element having text indicating a configuration status of the associated attribute.

4. The system of claim 3, wherein each attribute configuration status element is configured to be selectable, and wherein, in response to receiving a selection of a particular attribute configuration status element, the at least one processor is configured to execute the instructions of the CMDB importation tool to perform actions comprising:

presenting, via the GUI, an attribute import configuration pane including additional user input mechanisms configured to receive addition user input to define the import configuration for the attribute that is associated with the selected attribute configuration status element.

5. The system of claim 4, wherein the additional user input mechanisms of the attribute import configuration pane includes:

a first user input mechanism configured to receive a selection of a predefined transformation applied to the associated attribute during importing; and a second user input mechanism configured to receive a script that defines a custom transformation applied to the associated attribute during importing.

6. The system of claim 1, wherein, prior to receiving the user input, the import configuration comprises a pre-defined import configuration stored in the import sources table, wherein the pre-defined import configuration is defined based on a structure of the external service data and not a structure of the one or more CI tables of the CMDB.

7. The system of claim 1, wherein the import configuration comprises a plurality of transformations for a respective plurality of attributes of the external service data, and wherein, to import the external service data, the at least one processor is configured to execute the instructions of the CMDB importation tool to perform actions comprising:

respectively applying the plurality of transformations to the plurality of attributes of the external service data before storing the external service data in the one or more CI tables of the CMDB.

8. The system of claim 1, wherein the import configuration comprises a relationship between two CI tables of the CMDB that is enforced during importing, and wherein the relationship comprises a "Depends on::Used by" class relationship or a "Used::Used by" class relationship between the two CI tables.

9. The system of claim 1, wherein the external service comprises an endpoint detection and response service, a system manager application, a cloud-base security and compliance service, or an informational technology asset management service.

10. A computer-implemented method, comprising:

receiving user input defining an import configuration of an import operation to import external service data generated by an external service, wherein the import configuration comprises a relationship that is defined between two configuration item (CI) tables of a plurality of CI tables of a configuration item database (CMDB);

storing the import configuration of the import operation;

receiving the external service data generated by the external service; and importing the external service data into at least one of the two CI tables of the CMDB in accordance with the import configuration, wherein a portion of the external service data that does not comply with the relationship defined between the two CI tables of the CMDB is discarded when importing the external service data.

11. The method of claim 10, comprising:

presenting a graphical user interface (GUI) before receiving the user input, wherein the GUI includes user input mechanisms configured to receive the user input to define the import configuration of the import operation.

12. The method of claim 10, wherein the import configuration comprises a mapping between attributes of the external service data and attributes of the CI tables of the CMDB, and wherein importing comprises:

storing the external service data in the CI tables of the CMDB in accordance with the mapping of the import configuration.

13. The method of claim 10, wherein the import configuration comprises a transformation that is associated with an attribute of the external service data, and wherein importing comprises:

applying the transformation to the associated attribute before storing the external service data in the one or more CI tables of the CMDB.

14. The method of claim 10, wherein receiving the external service data comprises:
sending a request to the external service for the external service data, and in response, receiving the external service data from the external service.

15. One or more non-transitory, computer-readable media at least collectively storing instructions of a configuration item database (CMDB) importation tool that are executable by a processor of a computer system, wherein the instructions comprise instructions to:
present a GUI of the CMDB importation tool, wherein the GUI includes user input mechanisms that receive user input to define an import configuration of an import operation to import external service data;
receive the user input via the GUI of the CMDB importation tool and define the import configuration of the import operation based on the user input;
store the import configuration of the import operation in an import sources table; and
in response to receiving the external service data, import the external service data into the CMDB in accordance with the import configuration, wherein the import configuration comprises a mapping between attributes of the external service data and attributes of the one or more CI tables that defines where the external service data is stored in the CMDB during importing.

16. The media of claim 15, wherein the instructions to present the GUI comprise instructions to:
present, via the GUI, an attribute configuration status element associated with an attribute of the external service data, wherein the attribute configuration status element is selectable and includes text indicating a configuration status of the associated attribute.

17. The media of claim 16, wherein the instructions to present the GUI comprise instructions to:
in response to receiving a selection of the attribute configuration status element, present, via the GUI, an attribute import configuration pane that includes additional user input mechanisms configured to receive additional user input to define the import configuration for the associated attribute, wherein the additional user input mechanisms include:
a first user input mechanism configured to receive the additional user input selecting a configuration item (CI) table of the CMDB; and
a second user input mechanism configured to receive the additional user input selecting an attribute of the CI table in which the associated attribute of the external service data is stored during import.

18. The media of claim 15, wherein the instructions to present the GUI comprise instructions to:
after storing the import configuration, send a request to the external service for the external service data, and in response, receive the external service data from the external service.

* * * * *